United States Patent [19]
Michel et al.

[11] Patent Number: 5,828,947
[45] Date of Patent: Oct. 27, 1998

[54] METHOD OF POWER REGULATION IN A SATELLITE TELECOMMUNICATION NETWORK WITH AT LEAST TWO SATELLITES IN VIEW

[75] Inventors: Cyril Michel, Paris; Guillaume Calot, Versailles; Alain Feniou, Courbevoie; Denis Rouffet, Boulogne Billancourt, all of France

[73] Assignee: Alcatel Espace, Nanterre, France

[21] Appl. No.: 600,769

[22] Filed: Feb. 13, 1996

[51] Int. Cl.$^6$ ....................................................... H04B 7/185
[52] U.S. Cl. ............................ 455/13.4; 455/69; 455/522; 455/12.1
[58] Field of Search ............................ 455/69, 522, 12.1, 455/13.1, 13.4, 405

[56] References Cited

U.S. PATENT DOCUMENTS

| | | | |
|---|---|---|---|
| 4,228,538 | 10/1980 | Scharlar-Nielsen | 455/9 |
| 4,261,054 | 4/1981 | Scharlar-Nielsen | 455/12 |
| 4,776,035 | 10/1988 | Duggan | 455/69 |
| 5,001,776 | 3/1991 | Clark | 455/226 |
| 5,305,468 | 4/1994 | Bruckrt et al. | 455/69 |
| 5,355,511 | 10/1994 | Hatano et al. | 455/11.1 |
| 5,396,540 | 3/1995 | Gooch | 455/427 |
| 5,579,367 | 11/1996 | Raymond et al. | 379/1 |
| 5,664,006 | 9/1997 | Monte et al. | 455/405 |

*Primary Examiner*—Nguyen Vo
*Assistant Examiner*—Darnell R. Armstrong
*Attorney, Agent, or Firm*—Sughrue, Mion, Zinn, Macpeak & Seas, PLLC

[57] ABSTRACT

The invention provides a method of regulating the power of transmission between first and second stations in a multiple satellite visibility satellite telecommunication network. The method comprises the following cyclic steps: regulation, for each of said N channels, of an isolated transmit power level command signal such that when it commands the power at which the first station transmits the first isolated signal in each channel the quality level of the corresponding isolated second signal received by the second station is equal to a reference quality level, and regulation, for all of the N channels, of N combined transmit power level command signals such that when they command the levels at which the first station respectively transmits the N first combined signals on the N channels the quality level of the global signal received formed from the N combined second signals is equal to the reference quality level. Depending on whether the isolated command signal having the minimal level is such that this minimal level is less than or greater than a maximal tolerated isolated command level, the minimal level isolated command signal is selected to command the power with which the first station transmits a call signal in the corresponding channel, or the N combined command signals are selected to command the power with which the first station transmits respective combined call signals on the N channels.

13 Claims, 5 Drawing Sheets

METHOD OF POWER REGULATION IN A SATELLITE TELECOMMUNICATION NETWORK WITH AT LEAST TWO SATELLITES IN VIEW

BACKGROUND OF THE INVENTION

1. Field of the Invention

The present invention concerns a satellite telecommunication network. To be more precise, the invention concerns a method of regulating the power of transmission between a first or transmitter station and a second or receiver station in a satellite telecommunication network. In the multiple satellite visibility type of network which the invention concerns, a communication signal can be selectively transmitted from the first station to the second station either on different propagation paths via N respective satellites visible from both stations, in the form of N combined first signals which are received in the form of N combined second signals by the second station, together forming a global received signal, or via one of the N satellites on the corresponding propagation path, in the form of an isolated first signal received in the form of an isolated second signal by the second station, N being an integer greater than or equal to 2.

2. Description of the Prior Art

The signal power and the noise power received by the receiver station on each channel set up between the two stations vary. The signal power varies because of the characteristics of the channel. This variation is the result of fading due to the presence of obstacles, for example, or the presence of multiple paths that combine incoherently with the main component of the transmitted signal. Like the signal power, the noise power varies because of the characteristics of the channel. This variation can also be the result of variation in the power of the noise source.

The quality of the link set up via the channel deteriorates if nothing is done to remedy this problem of variation in the components of the received signal.

One simple prior art solution to this problem is to allow for the maximal fluctuations to which the received signal is likely to be subjected a priori. The transmitter station then transmits with a power margin that guarantees the quality of the link regardless of the propagation and interference environment associated with the channel. This solution leads to overspecification of the transmission system, loss of capacity and over-specification of the power transmitted by the terminals.

Another prior art method, known as the "closed loop" method, of controlling the power of a signal transmitted by a transmitter station is based on the following principle: the receiver station measures a signal to noise ratio level in the signal received from the transmitter station. The measured signal to noise ratio is transmitted in the form of a message from the receiver station to the transmitter station. The latter corrects the power level of the transmitted signal according to the level measured by the receiver station. There would appear to be only limited benefit in applying this method to the satellite networks mainly used until now, namely networks employing satellites in geostationary orbit at an altitude of approximately 38 000 km. In a network of this kind the round trip propagation time of a signal between the transmitter and receiver stations is substantially equal, ignoring processing times, to the response time of the power regulating means, which is the time between transmission of data by the transmitter station and the later time at which the power at which the data is transmitted is corrected on the basis of a measured received level of the transmitted signal. For a satellite at an altitude of approximately 38 000 km, the power correction response time is approximately 500 ms, which imposes an absolute limit on the possible correction of variations in the signal components to frequencies below $1/0.5 = 2$ Hz. In practise, given limitations induced by the system, the upper limit on this range is 1 Hz.

U.S. patent application Ser. No. 08/570,470 filed Dec. 11, 1995 by the present assignee and claiming priority from French patent application N* 95-09007 of 25 Jul. 1995 describes a predictive type power regulation method. This method comprises the successive steps of:

at a given time, predicting a representative value of a signal to noise ratio in the signal received by the receiver station at a later time, and then in the transmitter station, at a time after the given time and preceding the later time by an amount substantially equal to the propagation time between the first and second stations, adjusting the power of the first signal according to the predicted value.

The aim of this method is to maintain the power transmitted by the transmitter station in an optimal manner.

Referring to FIG. 1, in a multiple satellite visibility satellite telecommunication network, a first station SE can transmit to and receive from a second station SR via a plurality of satellites 1 and 2, in this example N=2 satellites, the station SE accordingly having N=2 directional antennas A1 and A2, each pointed at a respective satellite 1, 2. In this case, the signals received by the station SR from the N=2 satellites are combined, together forming a global received signal. It is also feasible for the station SE to transmit to and receive from the station SR via a single satellite 1 or 2. In practise the number N of satellites can be greater than 2.

A constant preoccupation for designers of satellite telecommunication networks, especially those using the CDMA (Code Division Multiple Access) technique, is to minimize the power transmitted for each call in order to increase the capacity of the network, whilst maintaining a satisfactory level of quality for each call. The prior art does not provide a solution to the problem of meeting this requirement in a multiple satellite visibility type satellite telecommunication network other than the use of the techniques referred to in the preamble of this description. The invention is therefore directed to providing a method of regulating the power of signals transmitted by a first station to a second station in a multiple satellite visibility type satellite telecommunication network.

SUMMARY OF THE INVENTION

To this end, the invention consists in a method of regulating the power of transmission between first and second stations in a satellite telecommunication network, a call signal being selectively transmitted from said first station to said second station either on different propagation paths via N respective satellites, in the form of N combined first signals received in the form of N combined second signals by said second station, together forming a global received signal, or via one of said N satellites on the corresponding propagation path, in the form of a first isolated signal received in the form of a second isolated signal by said second station, N being an integer greater than or equal to 2, said method comprising the following cyclic steps:

regulation, for each of said N channels, of an isolated transmit power level command signal such that when it commands the power at which the first station transmits the first isolated signal in each of said channels the quality level of the corresponding isolated second signal received by the second station is equal to a reference quality level, and regulation, for all of said N channels, of N combined transmit power level command signals such that when they command the levels at which the first station respectively transmits the N combined first signals on said N channels the quality level of the global received signal formed from the N combined second signals is equal to the reference quality level, and where the isolated command signal having the minimal level is such that this minimal level is also less than a maximal tolerated isolated command level, selection of said minimal level isolated command signal to command the power with which the first station transmits the isolated first signal in said corresponding channel, otherwise, selection of said N combined command signals to command the power with which the first station transmits the respective combined first signals on said N channels.

The step of regulating each of said isolated command signals for a respective one of said N channels preferably comprises the following substeps:

periodic measurement, by the second station, of a quality level and of a representative signal to noise ratio value in a received second measurement signal which corresponds to a first measurement signal transmitted by said first station on said channel, transmission by said second station to said first station of said quality levels and representative signal to noise ratio values periodically measured, production by the first station of each of said isolated command signals in accordance with said quality levels and representative signal to noise ratio values received.

The step of production by the first station of each of said isolated command signals typically comprises the following substeps:

prediction, at a given time, of a representative value of a signal to noise ratio in said second measurement signal received at a later time, and modification of the level of the isolated command signal, in accordance with said predicted value, in said first station, at an intermediate time after said given time and before said later time by an amount substantially equal to the propagation time via said channel between said first and second stations.

The prediction step may consist in extrapolation of said predicted value in accordance with a plurality of representative signal to noise ratio values received before said given time.

In parallel with this, the step of regulating said combined command signals comprises the following substeps:

periodic measurement, by the second station, of a global quality level and a global representative signal to noise ratio value in a second global measurement signal formed from said N first measurement signals transmitted by said first station in said N channels, respectively, transmission by said second station to said first station of said global quality levels and global representative signal to noise ratio values periodically measured, production, by the first station, of said combined command signals in accordance with, firstly, said global quality levels and global representative signal to noise ratio values and, secondly, said isolated command signals.

The step of production, by the first station, of the combined command signals then comprises the following substeps:

prediction, at a given time, of a representative value of a signal to noise ratio in said second global measurement signal received at a later time, and for each channel weighting of said predicted value representative of a signal to noise ratio in said second global measurement signal in accordance with said isolated command signals, and modification of a respective one of said combined command signals at an intermediate time after the given time and before said later time by an amount substantially equal to the propagation time between the first and second stations via said channel.

The step of prediction of the representative value of a signal to noise ratio in said second global measurement signal received at a later time consists in extrapolation of said predicted value in accordance with a plurality of global representative signal to noise ratio values received before said given time.

In a first embodiment, the first measurement signals transmitted on the respective N channels are pilot signals transmitted continuously by said first station.

In a second embodiment, the first measurement signals transmitted on said N channels are any signals transmitted by said first station.

The measurement, by the second station, of the last of said plurality of representative signal to noise ratio values advantageously precedes said later time by an amount substantially equal to the round trip propagation time between the first and second stations, and the measurement, by the second station, of the last of said plurality of global measurement signal power levels, required for said extrapolation, preferably precedes said later time by an amount substantially equal to the round trip propagation time between the first and second stations.

To implement the method of the invention a receiver station in a telecommunication network adapted to receive from a transmitter station a signal transmitted by said transmitter station on different propagation paths via N respective satellites, in the form of N combined first signals received in the form of N combined second signals by said second station, together forming a global received signal, comprises:

means for periodically measuring a quality level and a representative signal to noise ratio value in each combined second signal and for periodically measuring a global quality level and a global representative signal to noise ratio value in said global received signal.

A transmitter station adapted to set up a call to a receiver station as defined hereinabove comprises:

means for regulating, for each of said N channels, an isolated transmit power level command signal such that when it commands the power at which the first station transmits a first signal on each of said channels, the quality level of a corresponding second signal received by the second station is equal to a reference quality level, and means for regulating, for all of said N channels, N combined transmit power level command signals such that when they command the powers at which the transmitter station respectively transmits N combined first signals on said N channels, the quality level of the global received signal formed from the N combined second signals is equal to the reference quality level, and when the isolated command signal having the minimal level is such that this minimal level is also less than a maximal tolerated isolated command level, means for selecting the minimal level isolated command signal to command the power at which the first station transmits a call signal on said corresponding channel and for otherwise selecting said N combined command signals to command the powers at which the first station transmits combined call signals respectively on said N channels.

Other features and advantages of the present invention will emerge more clearly from a reading of the following description with reference to the corresponding appended drawings.

DETAILED DESCRIPTION OF THE PREFERRED EMBODIMENTS

Figure 1:
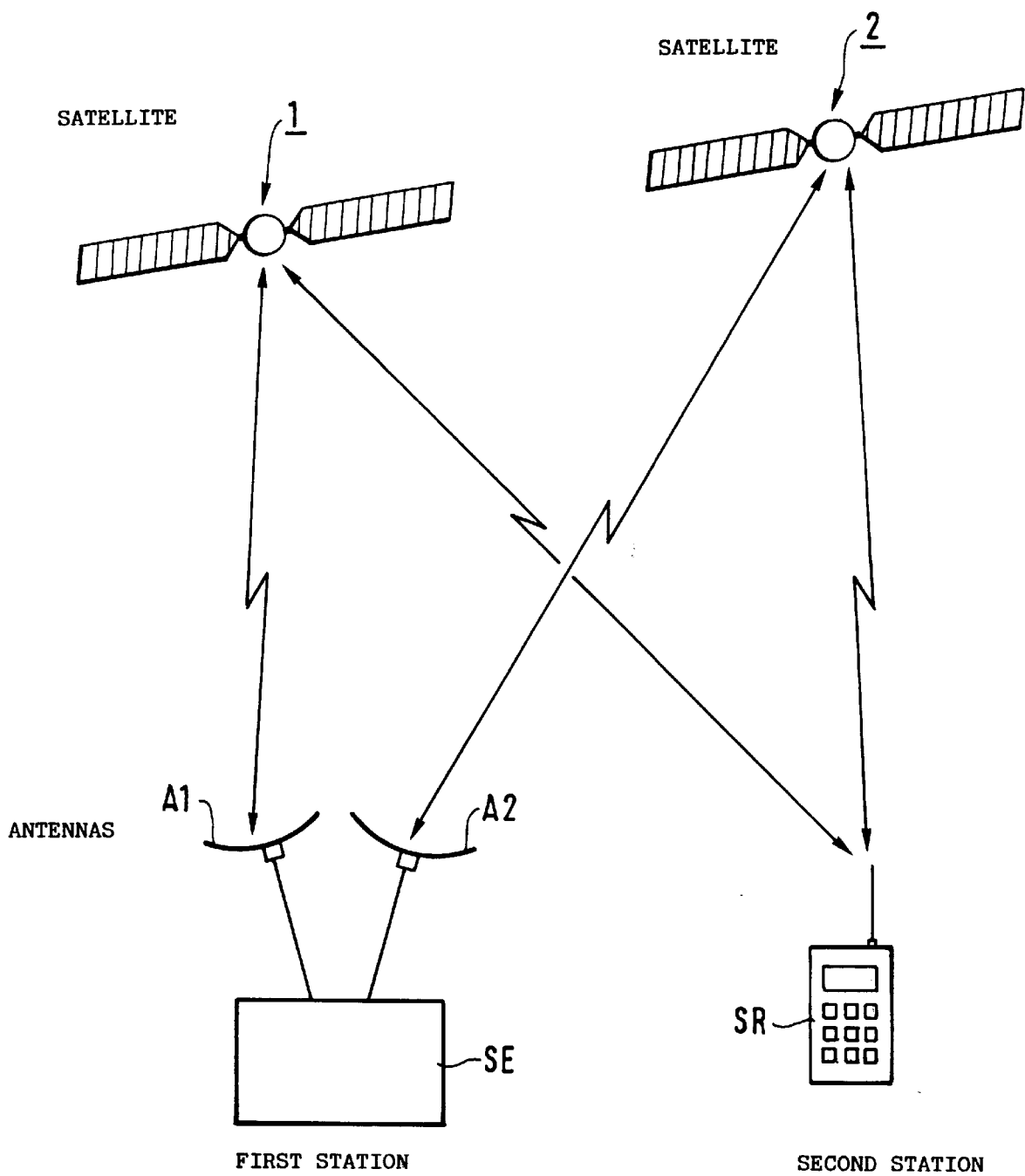
FIG. 1, already commented on, is a diagrammatic representation of a multiple satellite visibility type satellite telecommunication network.
Figure 2:
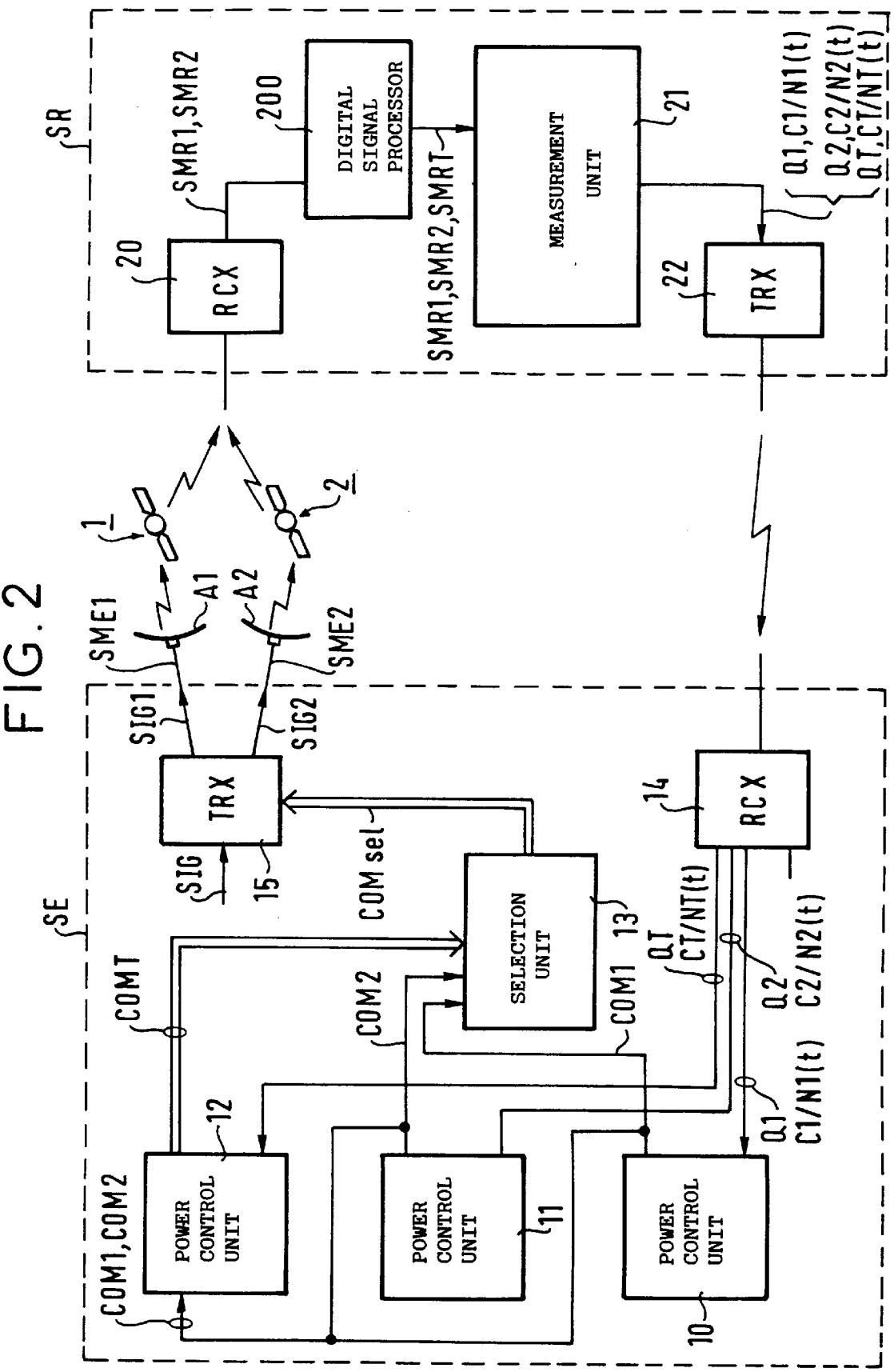
FIG. 2 is a block diagram showing two stations in the satellite telecommunication network from FIG. 1 between which a call has been set up.

The two stations SE and SR implementing the invention will now be described with reference to FIG. 2. In accordance with the invention it is supposed that the station SE is able to set up to a call to the station SR via one of the N=2 or both of the N=2 satellites 1 and 2. The station SE includes a receiver/demodulator 14, (N+1)=3 power control units 10, 11 and 12, a selector unit 13 and a transmitter/modulator 15. The station SR includes, in cascade, a receiver/demodulator 20, a signal processor unit 200, a measuring unit 21 and a transmitter/modulator 22.

For a given call, involving the station SE transmitting a signal SIG to the station SR, either the station SE produces N=2 combined first channel signals SIG1 and SIG2 which are transmitted to the station SR via the respective satellites 1 and 2 on respective different propagation paths, or channels, and which are received in the form of combined second channel signals by the station SR, together forming a global received signal, or it produces an isolated first channel signal SIG1 or SIG2 for the call in question which is transmitted via one of the satellites 1 or 2 on a given propagation path to the station SR, and which is received in the form of a corresponding isolated second channel signal by the station SR. In all cases, the combined first channel signals SIG1 and SIG2 transmitted via respective satellites 1 and 2 or the single isolated first channel signal SIG1 or SIG2 transmitted each correspond to the signal SIG of the call in question.

N=2 second channel signals, known as measurement signals, SMR1 and SMR2 are received by the station SR from the station SE via the satellites 1 and 2, respectively, and therefore on different channels 1 and 2. The signal processor unit 200 firstly reproduces these second measurement signals SMR1 and SMR2 and secondly forms a global received measurement signal SMRT which is the result of combining the second measurement signals SMR1 and SMR2. This combination is the result of adding the second measurement signals allowing for the time-delays between the second signals due to the different propagation paths that each has taken. For example, each second measurement signal SMR1, SMR2 received by the station SR for a respective one of the propagation paths corresponds to a first pilot measurement signal SME1, SME2 transmitted continuously by the station SE via the corresponding satellite. In an alternative embodiment, each second measurement signal SMR1, SMR2 received by the station SR for a respective one of the channels corresponds to a first signal SME1, SME2 transmitted on that channel by the first station for the call SIG in question between the stations SE and SR or for a different call.

Figure 6:
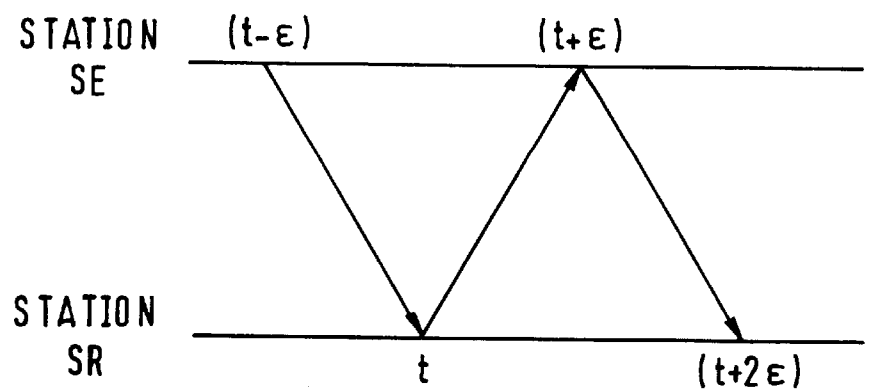
FIG. 6 is a timing diagram showing the propagation of signals transmitted between the two stations from FIG. 1.

Reference will now be made to FIG. 6 to explain particular times that are decisive to understanding the invention, bearing in mind that the method of the invention is applied continuously to assess the power required and to regulate the power transmitted by the transmitter 15 accordingly.

At time $(t-\epsilon i)$, for a given channel $i$ ($i$ between 1 and N), the transmitter 15 of the station SE transmits a first measurement signal SMEi at a given power on this channel. This first measurement signal SMEi is received by the receiver 20 in the station SR at time $t$, in the form of a second measurement signal SMRi, with a time-delay $\epsilon i$ equal to the one-way propagation time between the stations SE and SR for the channel $i$ concerned. Each first measurement signal SMEi, where $i$ is between 1 and N=2, transmitted by the transmitter 15 is a direct sequence spread spectrum signal, for example. The receiver 20 in the station SR reconstitutes each second measurement signal received, i.e. for N=2 satellites the signals SMR1, SMR2. Thus for each of the N=2 channels, the receiver 20 supplies a second measurement signal SMR1, SMR2 corresponding to a first measurement signal SME1, SME2 transmitted by the transmitter 15. These second measurement signals are applied to the digital signal processor unit which reproduces the second measurement signals SMR1, SMR2 and forms the global received second measurement signal SMRT.

Each of the second measurement signals SMR1, SMR2 and SMRT is applied to an input of the measurement unit 21 and is processed in the following manner (the following description refers only to the signal SMR1, the other signals SMR2 and SMRT being processed in exactly the same way): a low-pass filter, with a cut-off frequency of 100 Hz, for example, stops low-frequency noise components of the signal SMR1 under consideration. At the output of this low-pass filter the useful signal component $C1(t)$ of the signal SMR1 is therefore measured approximately, the low-frequency noise component having been blocked by the filter. By subtracting this useful signal component $C1(t)$ from the received signal SMR1, the unit 21 establishes the noise component $N1(t)$ in the signal SMR1 at time $t$. The measurement of the signal component $C1(t)$ and the noise component $N1(t)$ by the unit 21 can be replaced by measurement of any two values respectively representative of the power of the useful signal and the power of the noise signal. The unit 21 is therefore able to measure the signal to noise ratio $C1/N1(t)$ in the signal SMR1 at time $t$ by dividing the component $C1(t)$ by the component $N1(t)$. The unit 21 also measures periodically, typically with a periodicity in the order of 1 second, a quality level Q1 of the signal SMR1, typically a frame error rate or a bit error rate.

The above operations being carried for each of the signals SMR1, SMR2 and SMRT, the measurement unit 21 produces periodically, for example at one second intervals, the respective quality levels Q1, Q2 and QT for the signals SMR1, SMR2 and SMRT and, at at more high frequency than for the quality levels, the representative signal to noise ratio values C1/N1(t), C2/N2(t) and CT/NT(t) for the same signals SMR1, SMR2 and SMRT.

These quality levels Q1, Q2 and QT and representative signal to noise ratio values C1/N1(t), C2/N2(t) and CT/NT(t) are then transmitted by the transmitter 22 of the station SR to the receiver 14 of the station SE, typically in the form of messages.

In the station SE the N=2 pairs (Q1, C1/N1(t)) and (Q2, C2/N2(t)) are respectively applied to the N=2 power control units 10 and 11. The pair (QT, CT/NT(t)) is applied to the power control unit 12. Respective outputs of the units 10, 11 and 12 are connected to the selector unit 13. The respective outputs of the units 10, 11 carry isolated command signals COM1 and COM2. The output of the unit 12 carries combined command signals COMT.

Figure 3:
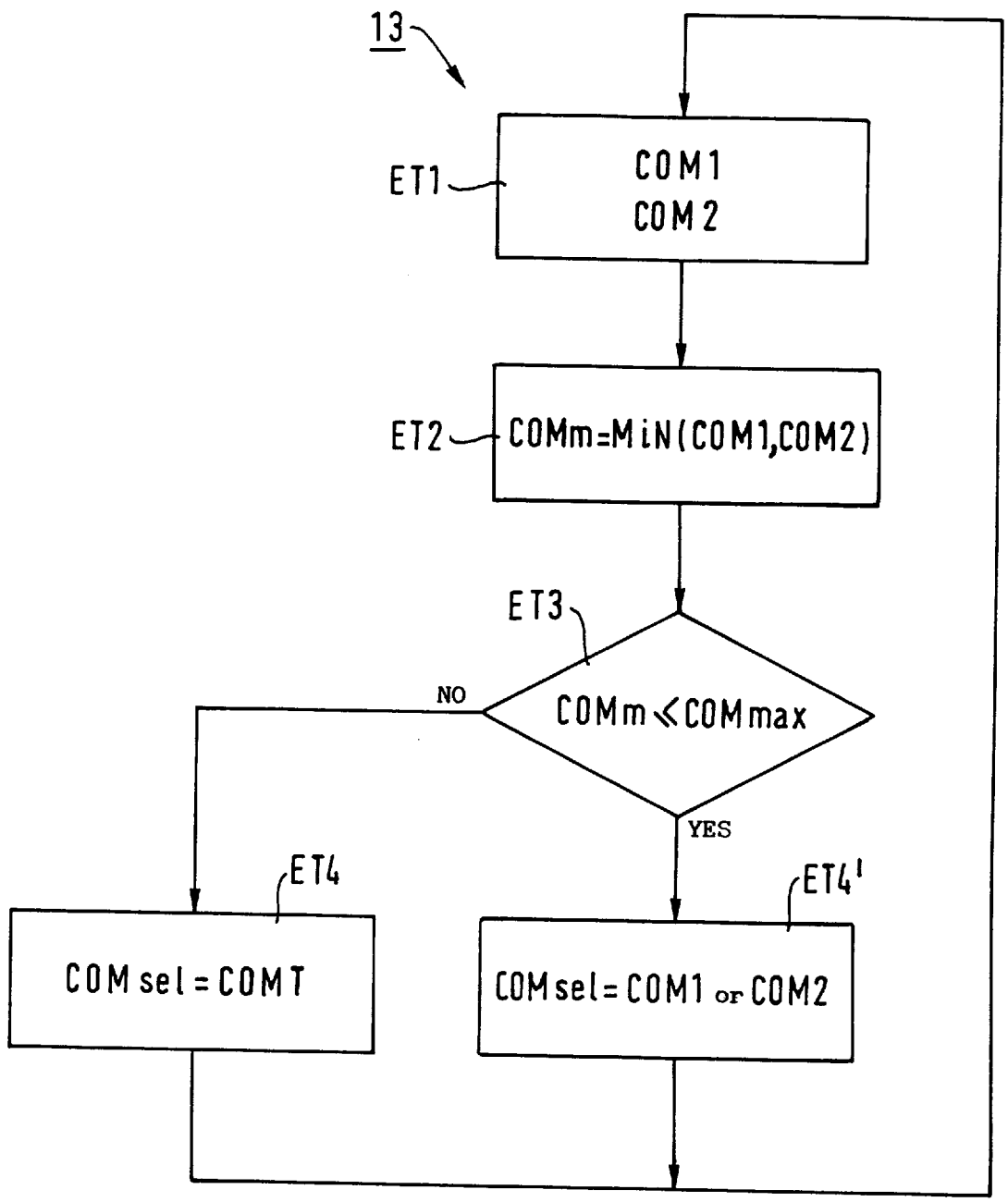
FIG. 3 shows an algorithm used by a selector unit in one of the two stations shown in FIG. 2.

The selector unit 13 will now be described with reference to FIG. 3. In step ET1, the selector unit 13 receives each of the isolated command signals COM1 and COM2. Each of the isolated command signals COM1 and COM2 is associated with a power level produced by the transmitter 15 on the respective channel in question when that isolated command signal is applied to the transmitter for that channel 1 and 2. As will emerge below in the description of FIGS. 4 and 5, the isolated command signals COM1 and COM2 are such that when they are applied to the transmitter 15 the respective quality level Q1, Q2 of each of the second signals SMR1, SMR2 is equal to a reference quality level Qref.

Then, in a step ET2, the selector unit 13 retains whichever of the N=2 isolated command signals COM1 and COM2 has the minimal (in this example lower) level, this signal being denoted COMm: COMm=MIN (COM1, COM2). A test step ET3 is then started. The function of this test step is to test if the minimal level of the isolated command signals is less than a maximal tolerated isolated command level COMmax.

If the isolated command signal COM1 or COM2 which has the minimal level (COMm) is such that this minimal level COMm is also less than the maximal tolerated isolated command level COMmax, this minimal level isolated command signal is selected in step ET4' to command the power at which the first station SE transmits the call signal SIG, in the form of either the signal SIG1 or the signal SIG2, on the only channel corresponding to that command signal COM1 or COM2.

Otherwise, in step ET4, said N combined command signals COMT are selected to command the power at which the first station transmits the combined first signals SIG1 and SIG2 in said N channels, respectively.

Figure 4:
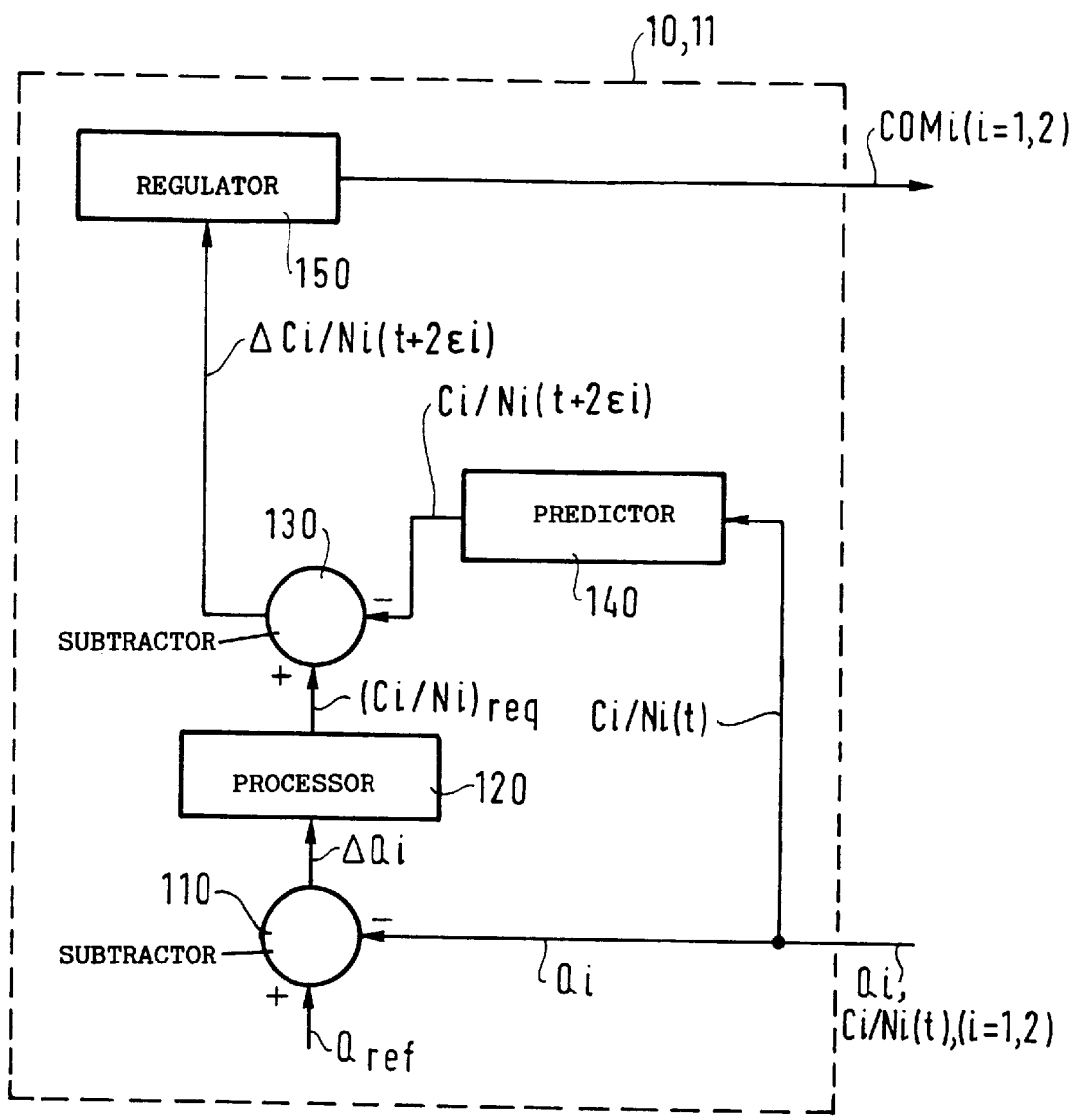
FIGS. 4 and 5 are detailed block diagrams of power control units included in one of the two stations shown in FIG. 2.

Referring to FIG. 4, each of the power control units 10 and 11 includes a first subtractor 110, a processor circuit 120, a second subtractor 130, a predictor circuit 140 and a regulator circuit 150. As the units 10 and 11 are identical, the following description refers to only one of them, using the suffix $i$ in association with the measured quality level Qi and the signal to noise ratio value Ci/Ni(t), the suffix $i$ in practise assuming the value 1 or 2 in relation to the N=2 power control unit 10 or 11, respectively.

The quality level Qi received from the station SR is applied to a first input of the subtractor 110, a second input of which receives a reference quality level Qref. The output of the subtractor 110 is connected to an input of the processor circuit 120, an output of which is connected to a first input of the subtractor 130. The subtractor 130 receives on a second input the output of the predictor circuit 140, the latter receiving at its input the signal to noise ratio value Ci/Ni(t) received from the station SR. The output of the subtractor 130 is connected to an input of the regulator circuit 150 which produces at its output an isolated command signal COMi.

The subtractor 110 subtracts the quality level Qi from the reference quality level Qref. The subtractor 110 delivers at its output a quality difference value ΔQi which is applied to one input of the processor circuit 120. The latter establishes a required signal to noise ratio value (Ci/Ni)req according to the quality difference value ΔQi.

The function of the circuit 120 is therefore to slave the level Qi cyclically measured by the station SR to the reference quality level Qref. Accordingly, if the quality difference value ΔQi is greater than 0, the processor circuit 120 reduces the current value of (Ci/Ni)req. On the other hand, if the quality difference value ΔQi is less than 0, the circuit 120 increases the current value of (Ci/Ni)req. This allows for the fluctuating nature of the characteristics of the transmission path for the channel concerned (i=1 or 2).

In parallel with this, as shown in FIG. 6, the signal to noise ratio value Ci/Ni(t) measured by the station SR at time $t$ is received, in the form of a message, by the predictor circuit 140 in the station SE at time (t+εi), with a time-delay equal to the propagation time εi between the stations SR and SE, which depends on the channel concerned (i=1 or 2). The circuit 140 has already received a plurality P of measured signal to noise ratio values for the second measurement signal, for respective successive times tp, t(p+1), t(p+2), etc preceding time $t$. Like Ci/Ni(t), these successive measured values of the signal to noise ratio are based on measurement by the station SR, at said times preceding time $t$, of a plurality of power levels of the second measurement signal for the channel in question, and measurement of a signal to noise ratio value in the respective signal received by the station SR for each of the plurality P of measured power levels of the second measurement signal. This is a result of the iterative nature of the method of the invention, which offers continuous regulation of the power transmitted by the station SR.

The function of the predictor circuit 140 is to predict by extrapolation a signal to noise ratio value Ci/Ni(t+2.εi) at a time (t+2.εi) which coincides (see FIG. 6) with the time at which the station SR receives a signal transmitted by the station SE at time (t+εi).

Accordingly, at time (t+εi), the station SE is in possession of the predicted signal to noise ratio value Ci/Ni(t+2.εi) and, on the basis of this value Ci/Ni(t+2.εi), is able to regulate the power to be transmitted by the station SE at this time (t+εi) in order to influence the signal to noise ratio value in the second signal received by the station SR at time (t+2.εi). By predicting a signal to noise ratio value for the signal received by the station SR at time (t+2.εi), and given the propagation time εi between the stations SE and SR for the channel in question (i=1 or 2), it is possible to regulate at time (t+εi) the power transmitted by the transmitter 15 to modify advantageously the signal to noise ratio value of the signal that will be received by the station SR at time (t+2.εi). It would appear particularly advantageous for the time $t$ at which the station SR measures the last of the plurality of power levels required to carry out the extrapolation to precede the time (t+2.εi) by an amount substantially equal to the round trip propagation time (2.εi) between the stations SE and SR. This produces a predicted signal to noise ratio value Ci/Ni(t+2.εi) of the signal received by the station SR at time (t+2.εi)

which is the result of an optimal extrapolation, given that the round trip propagation time between the two stations SE and SR for the channel in question cannot be reduced. This is the result of the self-evident principle that the effectiveness of an extrapolation is inversely proportional to the time period for which it is made.

In practise the predictor circuit is in the form of a processor circuit producing a 2nd order Taylor series expansion to predict $Ci/Ni(t+2.\epsilon i)$ according to the plurality P of measured signal to noise ratio values and the round trip propagation time $(2.\epsilon i)$ between the stations SE and SR. More generally, this processor circuit can be in the form of an adaptive filter.

The predicted signal to noise ratio value $Ci/Ni(t+2.\epsilon i)$ produced in this way is subtracted by the subtractor 130 from the required signal to noise ratio value $(Ci/Ni)req$ to produce a signal to noise ratio required variation indication $\Delta Ci/Ni(t+2.\epsilon i)$ which is applied to the input of the regulator circuit 150. In response, the latter modifies the isolated command signal COMi applied to an input of the selector unit 13.

Figure 5:
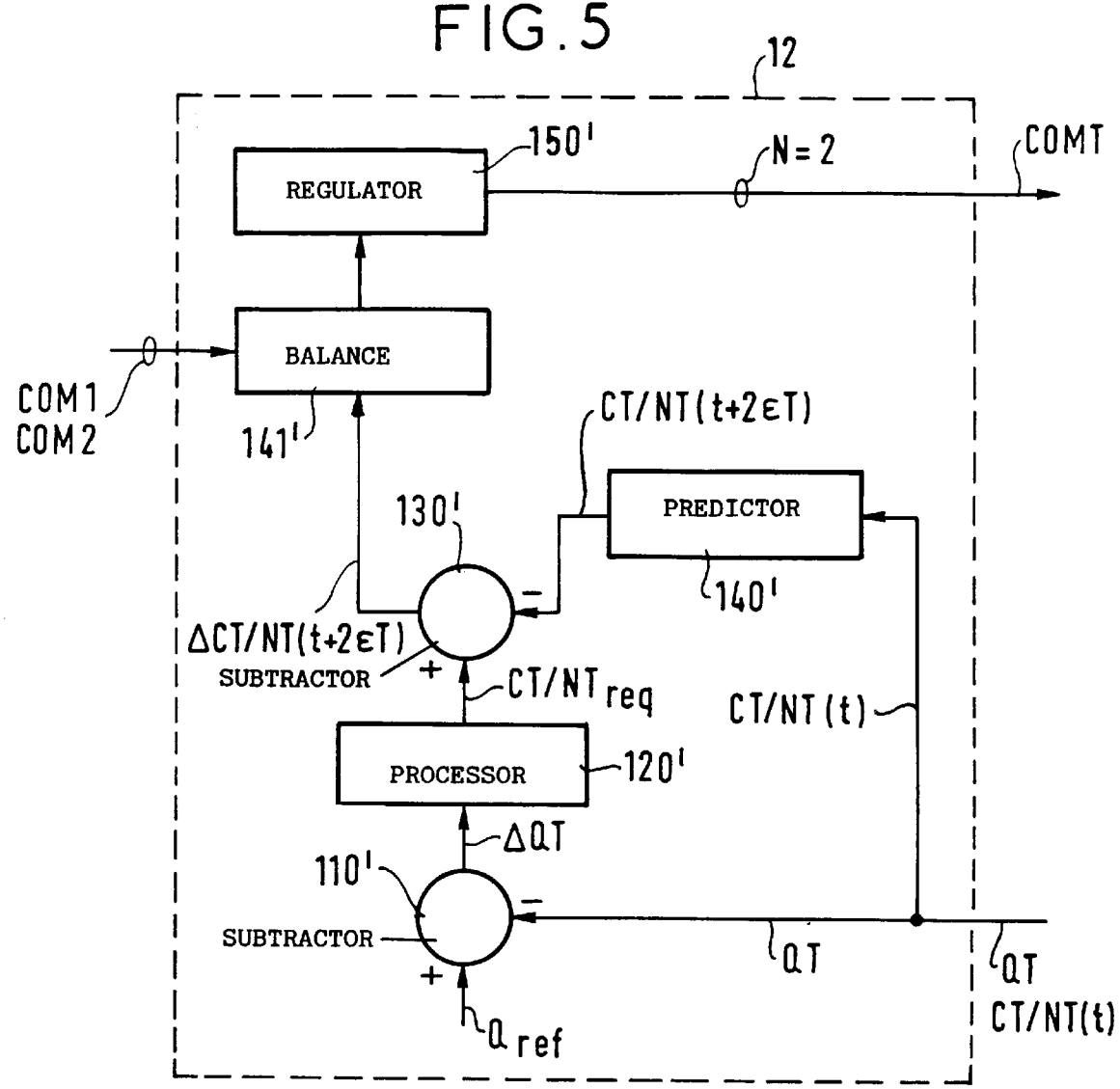

Referring to FIG. 5, the power control unit 12, which is slightly different from the units 10 and 11, nevertheless includes a first subtractor 110', a processor circuit 120', a second subtractor 130' and a predictor circuit 140' which are identical to and interconnected in exactly the same way as the subtractor 110, the processor circuit 120, the second subtractor 130 and the predictor circuit 140 in the N=2 units 10 and 11. In the unit 12 the output of the subtractor 130' is connected to an input of a regulator circuit 150' through a weighting unit 141'.

It must be borne in mind that the unit 200 in the station SR forms a global received measurement signal SMRT by combining the second measurement signals SMR1 and SMR2. The unit 21 then periodically measures a global quality level QT and, at a higher frequency, a global signal to noise ratio representative value $CT/NT(t)$ in this global measurement signal SMRT. These values and the periodically measured quality levels are transmitted by the station SR to the station SE. The quality levels QT are applied to a first input of the subtractor 110', a second input of which receives a reference quality level Qref. The global signal to noise ratio representative values $CT/NT(t)$ are applied to an input of the predictor circuit 140'.

Because the unit 12 operates in exactly the same way as the units 10 and 11, the output of the subtractor 130' produces a required signal to noise ratio variation signal $\Delta CT/NT(t+2.\epsilon T)$ which is applied to a first input of the weighting circuit 141'. The latter receives on N=2 second inputs the isolated command signals COM1 and COM2 produced by the units 10 and 11, respectively. $\epsilon T$ is equal to the maximal value of $\epsilon i$, i.e. it defines the maximal propagation time between the stations SE and SR via the various satellites.

The weighting unit 141' receiving the global required signal to noise ratio variation signal $\Delta CT/NT(t+2.\epsilon T)$ produces at its output N=2 required signal to noise ratio variation signals that are obtained by weighting the global required signal to noise ratio variation signal $\Delta CT/NT(t+2.\epsilon T)$ by the respective weighting coefficients A/COM1 and A/COM2, where $$A = \sum_{i=1}^{N=1} (1/COMi).$$

The regulator circuit 150' receives these weighted signals and, for each channel i, modifies a respective one of said combined command signals at an intermediate time $(t+2.\epsilon T-\epsilon i)$ following the given time t and preceding the later time $(t+2.\epsilon T)$ by an amount substantially equal to the propagation time $\epsilon i$ between the first and second stations via said channel.

There is claimed:

1. Method of regulating the power of transmission between first and second stations in a satellite telecommunication network, a call signal being selectively transmitted from said first station to said second station either on different propagation paths via N respective satellites, in the form of N combined first signals received in the form of N combined second signals by said second station, together forming a global received signal, or via one of said N satellites on the corresponding propagation path, in the form of a first isolated signal received in the form of a second isolated signal by said second station, N being an integer greater than or equal to 2, said method comprising the following cyclic steps:
regulation, for each of said N channels, of an isolated transmit power level command signal such that when it commands the power at which said first station transmits said first isolated signal in each of said channels the quality level of the corresponding isolated second signal received by said second station is equal to a reference quality level, and regulation, for all of said N channels, of N combined transmit power level command signals such that when they command the levels at which said first station respectively transmits said N combined first signals on said N channels the quality level of the global received signal formed from said N combined second signals is equal to said reference quality level, and where the isolated command signal having the minimal level is such that this minimal level is also less than a maximal tolerated isolated command level, selection of said minimal level isolated command signal to command the power with which said first station transmits said isolated first signal in said corresponding channel, otherwise, selection of said N combined command signals to command the power with which said first station transmits the respective combined first signals on said N channels.

2. Method according to claim 1 wherein said step of regulating each of said isolated command signals for a respective one of said N channels comprises the following substeps:

periodic measurement, by said second station, of a quality level and of a representative signal to noise ratio value in a received second measurement signal which corresponds to a first measurement signal transmitted by said first station on said channel, transmission by said second station to said first station of said quality levels and representative signal to noise ratio values periodically measured, production by said first station of each of said isolated command signals in accordance with said quality levels and representative signal to noise ratio values received.

3. Method according to claim 2 wherein said step of production by said first station of each of said isolated command signals comprises the following substeps:

prediction, at a given time, of a representative value of a signal to noise ratio in said second measurement signal received at a later time, and modification of the level of said isolated command signal, in accordance with said predicted value, in said first station, at an intermediate time after said given time and before said later time by an amount substantially equal to the propagation time via said channel between said first and second stations.

4. Method according to claim 3 wherein said prediction step consists in extrapolation of said predicted value in accordance with a plurality of representative signal to noise ratio values received before said given time.

5. Method according to claim 2 wherein said step of regulating said combined command signals comprises the following substeps:

periodic measurement, by said second station, of a global quality level and a global representative signal to noise ratio value in a second global measurement signal formed from said N first measurement signals transmitted by said first station in said N channels, respectively, transmission by said second station to said first station of said global quality levels and global representative signal to noise ratio values periodically measured, production, by said first station, of said combined command signals in accordance with, firstly, said global quality levels and global representative signal to noise ratio values and, secondly, said isolated command signals.

6. Method according to claim 5 wherein said step of production, by said first station, of said combined command signals comprises the following substeps:

prediction, at a given time, of a representative value of a signal to noise ratio in said second global measurement signal received at a later time, and for each channel weighting of said predicted value representative of a signal to noise ratio in said second global measurement signal in accordance with said isolated command signals, and modification of a respective one of said combined command signals at an intermediate time after said given time and before said later time by an amount substantially equal to the propagation time between the first and second stations via said channel.

7. Method according to claim 6 wherein said step of prediction of said representative value of a signal to noise ratio in said second global measurement signal received at a later time consists in extrapolation of said predicted value in accordance with a plurality of global representative signal to noise ratio values received before said given time.

8. Method according to claim 2 wherein said first measurement signals transmitted on the respective N channels are pilot signals transmitted continuously by said first station.

9. Method according to claim 2 wherein said first measurement signals transmitted on said N channels are any signals transmitted by said first station.

10. Method according to claim 4 wherein the measurement, by said second station, of the last of said plurality of representative signal to noise ratio values precedes said later time by an amount substantially equal to the round trip propagation time between said first and second stations.

11. Method according to claim 4 wherein the measurement, by said second station, of the last of said plurality of global measurement signal power levels, required for said extrapolation, precedes said later time by an amount substantially equal to the round trip propagation time between said first and second stations.

12. In a telecommunication network, a receiver station adapted to receive a signal transmitted by a transmitter station on N different propagation paths via N respective satellites, said signal being in the form of N combined first signals sent by said transmitter station to said N respective satellites, said signal being received by said receiver station in the form of N combined second signals from said N respective satellites, said first signals and said second signals together forming a global received signal, said receiver station comprising means for periodically measuring a quality level and a representative signal to noise ratio value in each of said N combined second signals, said receiver station including means for periodically measuring a global quality level and a global representative signal to noise ratio value in said global received signal.

13. In a telecommunication network, a transmitter station adapted to set up a call to a receiver station on N different propagation paths via N respective satellites, said call defining N combined first signals sent by said transmitter station to said N respective satellites and defining N combined second signals from said N respective satellites to said receiver station, said transmitter station comprising:

means for regulating, for each of said N propagation paths, an isolated transmit power level command signal such that, when the transmit power for said N combined first signals is commanded, a quality level of a corresponding one of said N combined second signals received by said receiver station is equal to a reference quality level, means for regulating, for said N propagation paths, N combined transmit power level command signals such that, when the transmit powers for said N combined first signals is commanded, the quality level of the global received signal is equal to said reference quality level, and means for selecting a minimal level isolated command signal such that, when said isolated transmit power level command signal having the minimal level is also less than a maximal tolerated isolated command level, said means for selecting selects said N combined command signals to command the powers at which said first station transmits said N combined first signals respectively on said N propagation paths.

* * * * *